No. 764,788. PATENTED JULY 12, 1904.
T. ARMAT.
VITASCOPE.
APPLICATION FILED SEPT. 18, 1903.
NO MODEL. 3 SHEETS—SHEET 1.
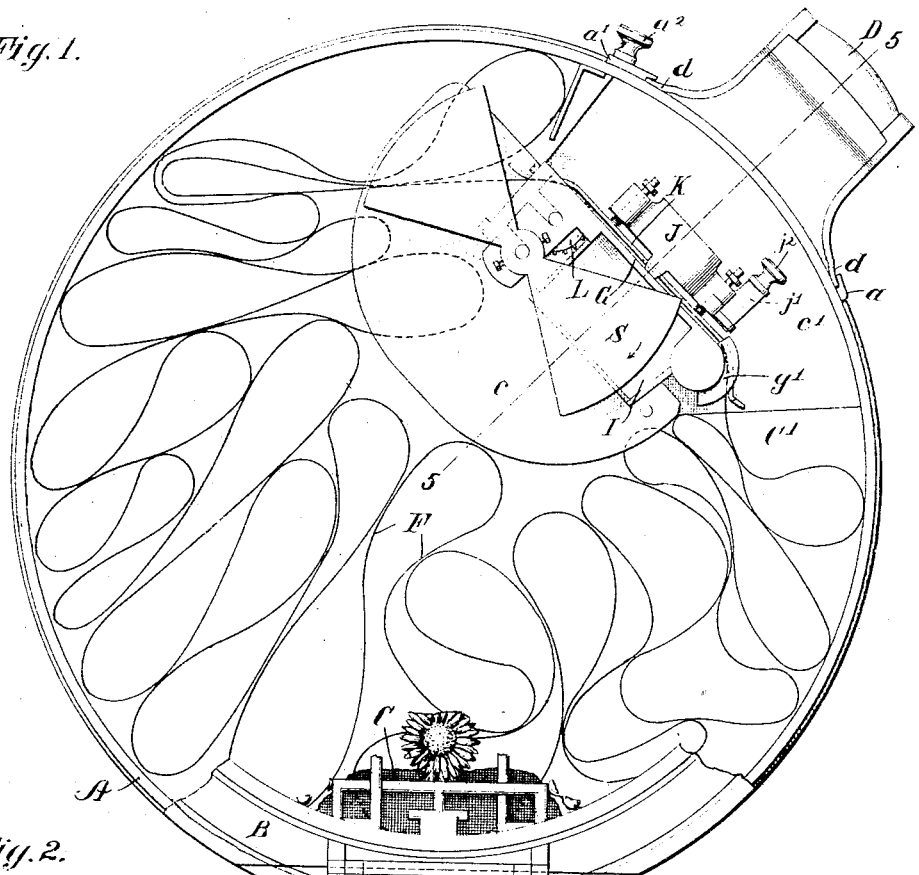
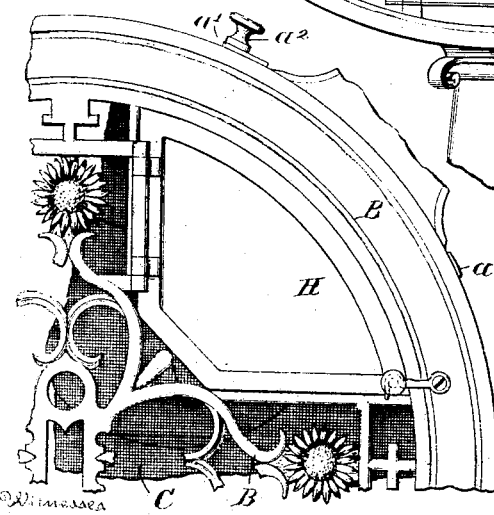
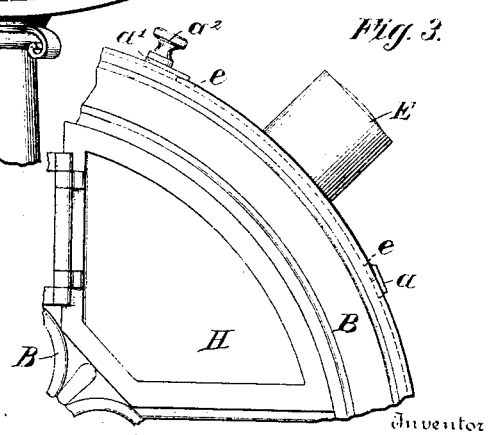
Witnesses:
H. S. Austin
K. M. Cromelin
Inventor
Thomas Armat
By
Wilson C. Dowell & Son
Attorneys

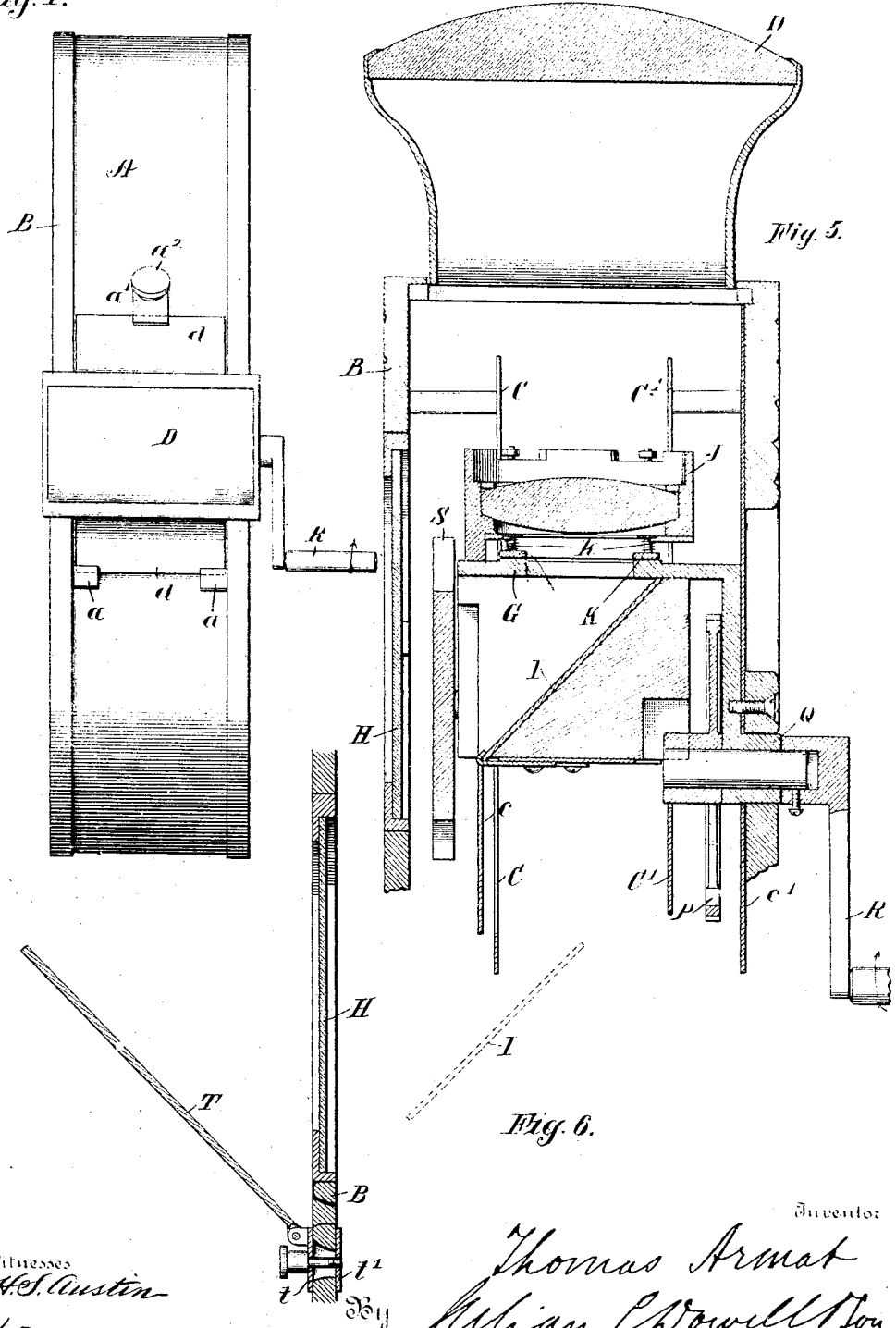

No. 764,788. PATENTED JULY 12, 1904.
T. ARMAT.
VITASCOPE.
APPLICATION FILED SEPT. 18, 1903.
NO MODEL. 3 SHEETS—SHEET 3.
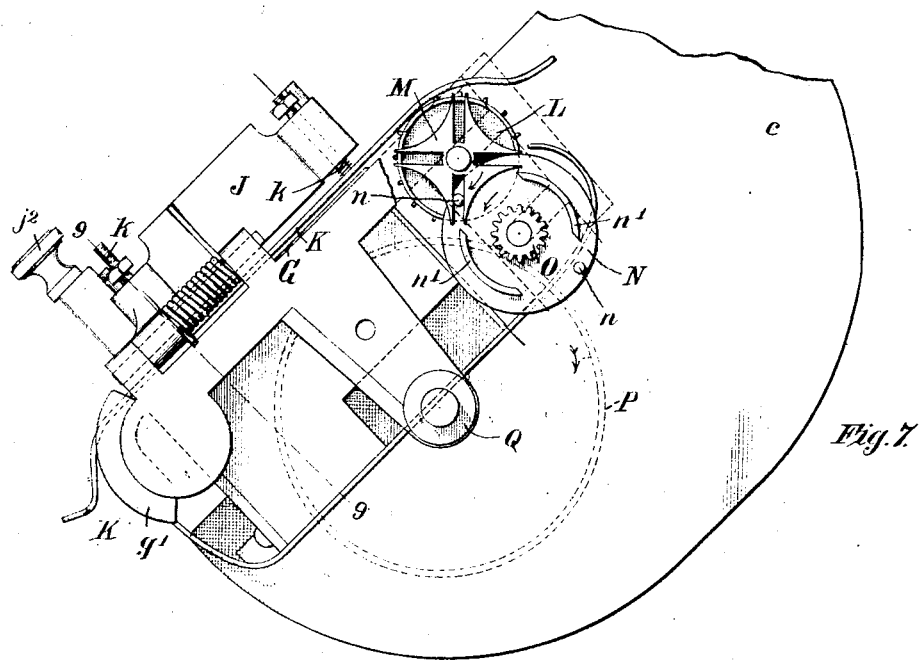
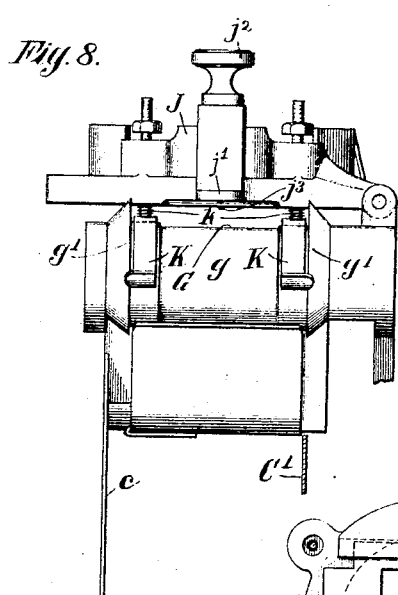
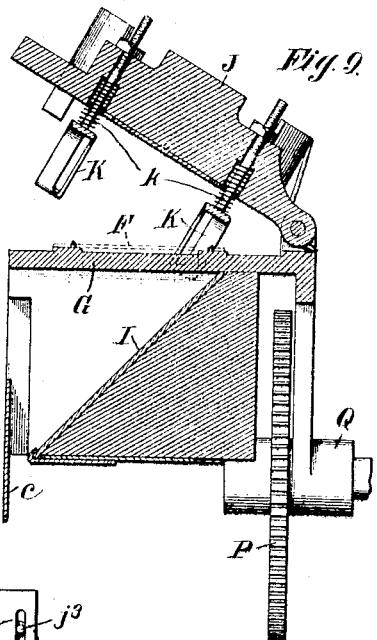
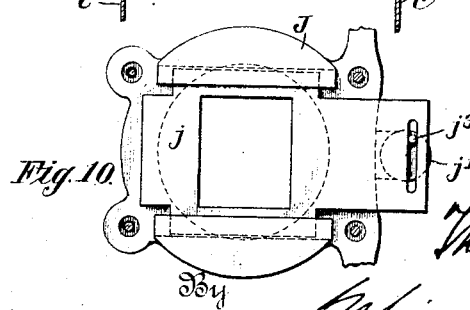
Witnesses
H. S. Austin
K. M. Cromelin
Inventor
Thomas Armat
By
Attorneys No. 764,788. Patented July 12, 1904.

UNITED STATES PATENT OFFICE.

THOMAS ARMAT, OF WASHINGTON, DISTRICT OF COLUMBIA.

VITASCOPE.

SPECIFICATION forming part of Letters Patent No. 764,788, dated July 12, 1904.

Application filed September 18, 1903. Serial No. 173,724. (No model.)

*To all whom it may concern:*

Be it known that I, THOMAS ARMAT, a citizen of the United States, residing at Washington, in the District of Columbia, have invented certain new and useful Improvements in Vitascopes; and I do hereby declare the following to be a full, clear, and exact description of the invention, such as will enable others skilled in the art to which it appertains to make and use the same.

My invention relates to machines or apparatus for exhibiting in rapid progression a series of pictures showing successively the different attitudes or positions assumed by a person or object in motion, so as to give to the eye the appearance of the moving object or person through all the phases of its motion, and it has reference more particularly to that class of such machines in which the series of pictures to be reproduced or displayed are carried on an endless film or strip of transparent or translucent material which is properly moved to bring the pictures one after another between a suitable illuminator or source of light and the eye or an objective or projecting lens. Certain features of the invention are also applicable to machines employing continuous films, as will appear from the following description.

In prior machines of this character in which the pictures have been carried on endless transparent films it has been necessary to place a suitable light or illuminator within the length of the endless film behind the portion thereof which is exposed, so as to project the rays of light through the film and illuminate the pictures at the point of exposure, and consequently it has also been necessary to house the bulk of the film and the illuminator in separate compartments to prevent diffusion of the light and concentrate its rays on the part of the film which is exhibited and to carry a part of the film a considerable distance around the illuminator or its compartment, thus increasing the size and bulk of the machine.

The primary objects of my invention are to provide a simple and effective arrangement and means for illuminating the pictures on a transparent or translucent strip or film by light passing laterally to the film with a view especially to supplying the necessary brightness from the surrounding natural light or from a source of light entirely external to the machine, so that the machine is ready to operate anywhere by daylight or any other exterior surrounding light; to provide an arrangement and construction of the machine as a whole which shall be exceedingly simple, light, and compact, permitting the operating mechanism, lenses, and the whole length of the film to be assembled in very small compass and which shall be convenient in use in inserting or withdrawing the film and in access to the mechanism; to dispense with the necessity of means for paying out the film regularly to the feeding device and to provide an arrangement whereby the film will constantly present slack of its own accord, and to improve in certain particulars the details of the mechanism and other parts, all with a view to producing a simpler, smaller, and more efficient machine.

In effecting a practical embodiment of my invention I provide a narrow casing for the film and operating mechanism, preferably circular, hexagonal, or of similar conformation, though any suitable design may be adopted. In the rim or peripheral portion of the casing an opening is provided through which the moving picture is observed or projected, according to whether it is displayed in the machine itself or thrown on a screen. The picture-carrying film passes beneath or on the inside of this opening and is moved to bring the series of pictures thereon successively within the range of vision or projection in a well-known manner. The mechanism for supporting, tensioning, and feeding the film is simply and compactly arranged beneath or at the inside of said opening, while the greater length or bulk of the film occupies the remainder of the casing, practically surrounding said mechanism and lying in loose folds or in any position it may assume and taking care of itself as it is continuously fed to display the pictures. The film as it is fed into the receptacle by the feeding mechanism assumes the form of a loop or loose fold. As these loops are formed each one is pushed along in the receptacle by the feeding in of the next succeeding loop until it is finally pushed around to the other side of the feeding mechanism, still in the form of a loop, where it is intermittently fed across the exposure-opening, the film being thus intermittently fed out of a loop or loose fold, thereby greatly reducing the liability to tear. Beneath the exposed portion of the film or that which is exhibited is placed a light deflecting or diffusing device, such as a mirror or piece of white cardboard or other light-diffusing surface, at an angle, preferably, forty-five degrees to the surface of the film or plane of the film as a whole, and this device deflects or diffuses through the film light derived from a lateral source or from the natural light or from any external source, as through an opening, glass, or other light-transmitting medium in the side of the casing. A mirror is preferably used, and when it is used it is desirable that the glass through which the light is admitted be roughened or ground, so as to catch and diffuse the light, and thus light up and become a lightened background for the pictures. While the film may be fed in any approved manner for properly exhibiting the pictures in such way as to give the appearance of the person or object in motion, I prefer as the most satisfactory way to feed it intermittently or with brief periods of rest to expose the pictures and exceedingly short intervals of movement to displace one picture and substitute the next one in its place, and in connection with the intermittent feeding mechanism I, also preferably provide a rotary or movable shutter at the side of the mirror or light-diffusing device adapted to obscure the light during the brief periods of movement of the film, said shutter being parallel with the plane of the film as a whole or at right angles to the picture-carrying surface thereof.

The arrangement thus described is exceedingly simple and compact and enables the production of a kinetoscope carrying a film of fifty or a hundred feet or more in a minimum of space, the whole machine being scarcely greater in size and weight than an ordinary parlor kaleidoscope.

There are also certain other novel and useful features of my invention which will appear hereinafter.

The invention will first be described with reference to the accompanying drawings, which are to be taken as a part of this specification, and it will then be defined more particularly in the annexed claims.

In said drawings, Figure 1 is a side elevation of an apparatus or machine embodying my invention with the side of the casing broken away to disclose the picture-carrying film and the operating mechanism. Fig. 2 is a fragmentary side elevation of the upper right-hand part of the machine with the side of the casing in place. Fig. 3 is a view similar to Fig. 2, but taking in less of the casing and showing the machine provided with a projecting lens in contradistinction to the observing-lens shown in Fig. 1. Fig. 4 is a front elevation of the machine looking directly down upon the observing-lens, which, as illustrated in Fig. 1, is in this instance mounted on the rim at the upper right-hand part of the casing. Fig. 5 is an enlarged fragmentary vertical cross-section taken on a line running from the center of the machine through the lens, as line 5 5 of Fig. 1, looking in the direction of the arrow. Fig. 6 is a detail view showing a fragment of the casing in vertical cross-section, with an attachment connected thereto for reflecting light derived from above the machine or from other points. Fig. 7 is a side elevation of the operating mechanism looking at the opposite side to that shown in Fig. 1. Fig. 8 is an end elevation of said mechanism looking at the end which the film in its movements approaches. Fig. 9 is a vertical cross-section through said mechanism on line 9 9 of Fig. 7, looking in the direction of the arrow, showing also the hinged member above the film-support raised. Fig. 10 is a detail view of the bottom of said hinged member, showing the device for adjusting the opening in the plate above the film.

The letter A denotes a box or casing for the film and operating mechanism, in this instance circular in form and mounted upright or vertically on a pedestal or support and having one side removable or hinged to open for access to the film and mechanism, as indicated in Fig. 1, where the side B is represented hinged at its bottom and broken away shortly above its hinge. The casing may consist of a circular or other suitable peripheral band or rim and ornamental reticulated or open-work sides, including the hinged side B, and thin plates C C' may be arranged on or at suitable distances within the inner sides of the casing, between which the folds of the picture-carrying film F are disposed and the film as a whole guided and held in proper vertical position, said inner plates, which are disclosed more clearly in Fig. 5, thus providing a storage space or receptacle for the film of substantially the width of the film and practically surrounding the moving mechanism. By reason of said reticulated or open-work sides, in addition to their ornamental appearance, the weight of the machine is materially reduced, while a proper and sufficiently-strong supporting-casing is at the same time provided. Said inner plates C C' may also be black or darkened on their outer faces, and showing through the reticulated sides they produce a clever and attractive appearance of darkness behind them, as indicated in the fragmentary view of Fig. 2. The plate C within the hinged side B is secured to and movable with said side, so that when the side is opened the whole film is at once exposed and accessible, or the receptacle therefor is accessible to permit the film to be inserted or withdrawn from the machine.

The opening through which the pictures are displayed may be located at any suitable point in the rim or peripheral portion of the casing, preferably a little to one side of the upper part, as indicated, so that when the machine is set on a table or support a person may look into the opening with ease and comfort. It is also desirable to have the opening high, since the exposed portion of the film is supported beneath the same and the rest of the film can then hang or rest in folds in the lower part of the receptacle. Said opening is shown in Figs. 1, 4, and 5 provided with an objective lens D for observing the moving picture directly in the machine, as in the usual coin-controlled kinetoscopes, while in Fig. 3 it is shown provided with a projecting lens E for throwing the picture on a screen. As a simple and convenient means for securing the lens, whichever one may be employed, detachable on the casing each lens may be mounted in a case or holder adapted to fit closely against the casing over the opening and having flanges, as $d$ or $e$, the lower one of which may rest in overlying lugs or projections $a$ below said opening, while the upper one may be clamped under an overlying lug $a'$ by means of a binding-screw $a^2$. The lug $a'$ may be slotted and the binding-screw inserted therein and screwed into the casing, so that when the screw is loosened the lug may easily be moved up out of engagement with the flange of the lens-holder. Any suitable means for mounting the lenses in place may of course be substituted.

A film-support or holding and tensioning device is located a suitable distance below or at the inner side of the objective opening in the casing over or through which the film is passed, depending at each end and the greater portion of its length resting in loose folds or in any position assumed by the film itself in its receptacle—for instance, as indicated in Fig. 1. The film is fed by any suitable mechanism, preferably intermittently, so as to bring the series of pictures thereon successively within the range of vision or within the focus of the objective or projecting lens in such manner as to reproduce to the eye the motion of the person or object represented. While appropriate film-feeding and tensioning devices are illustrated and described in the present case, it will be understood that such functions may be performed in numerous ways and by any suitable devices or mechanisms for the purpose.

The letter G in the drawings denotes a fixed film-supporting member consisting of a thin narrow plate over which the film travels, upwardly inclined in the present instance and having an opening to admit light through the back of the film to illuminate the pictures thereon. The natural light outside the casing or light from any external source may be used. It is admitted through an opening, glass plate, or other transparent or translucent medium in the side of the casing, here shown through a ground-glass plate H in the hinged side B. This plate may also be of clear glass or colored—as, for instance, amber or light blue—giving a sunlight or moonlight effect to the scene exhibited, as desired. Said glass plate is shown in this instance mounted in a frame or door hinged in an opening in the side B and adapted to be opened to expose the film support and mechanism. When the machine is used for projecting pictures, the door or plate H is opened to admit a strong clear light. The light-rays passing through said glass are diffused or deflected up through the opening in plate G and through the film by means of a suitable diffusing or deflecting surface I, located beneath the opening G and at an angle thereto and to the film. Where the pictures are exhibited in the machine itself, as ordinarily they are intended to be, any white or bright surface—such as cardboard, china, or the like—will answer for diffusing the light upwardly and illuminating the film at the point of exposure. If the machine is used for projecting the pictures onto a screen or foreign surface, a mirror is employed, set, preferably, at an angle of forty-five degrees to the surface of the film, and such a surface is preferably, through not necessarily, adopted in all instances. This device, besides being effective, permits a very simple and close arrangement, since the film is inclosed in a casing or chamber of internal width substantially the width of the film itself, while the light is admitted laterally or from a source outside said receptacle directly under the exposed or exhibited portion of the film and deflected or diffused immediately up through the same, thus dispensing with the need of a light or illuminator set back or inclosed within the film and the need of separate compartments for said film and illuminator. In the present instance the plate G is shown as a part of the frame for the operating mechanism and has depending sides between which the mirror or diffusing-surface I is inclosed. The said frame may be mounted in place in any suitable way, being preferably secured directly to the fixed side of the casing, the inner plate C' at that side being cut away to accommodate the frame and mechanism and a small black or darkened plate $c'$ being secured to the inner side of the casing to hide the mechanism and take the place of the cut-away part of the plate C'. (See Figs. 5 and 7.)

As a means for tensioning and frictionally holding the film at the point of exposure a suitable device is provided for gently or yieldingly forcing the film on or against the plate G with sufficient pressure to prevent flexing or puckering or any displacement of the portion of the film which has the objects or pictures thereon in position for reproduction. A simple and efficient device for this purpose consists of a hinged member J, which is spring-held down on or against the plate G, though not in contact with the film, and has a pair of thin strips K, which bear yieldingly upon the edges of the film or the portion thereof at opposite sides of the opening in the plate G in the passage of the film over said plate. Pins or stems $k$ may project from the upper sides of said strips into openings therefor in member J, and small coiled or other springs may be arranged on said pins between said member and said strips, thus furnishing the proper amount of yielding pressure. To prevent undue friction, as well as to keep the picture-carrying surface of the film free from wear, preferably the plate G has smooth raised surfaces or ways at its opposite sides, on which the edges of the film rest and against which they are gently pressed by said spring-actuated strips K, so that only the edge portions of the film contact either with the plate G or said strips. The film is easily applied to or detached from its supporting-plate and tension device merely by lifting up the hinged member, as shown in Fig. 9. Said hinged member is represented as circular in form and may inclose a condensing or a magnifying lens, as shown. Said member is also provided at its under side with a plate $j$, having an opening which registers with the opening in the plate G to permit exposure of the film through said member, and said plate $j$ is preferably movable or adjustable for varying the position of the opening therein in accordance with the pictures on the film, since the perforations on the picture-strip do not always occupy the same relation to the base-line of the pictures, and hence the pictures do not always occupy the same relation to the opening. A simple device for moving the plate is disclosed in Fig. 10, consisting of a spindle $j''$, journaled in a bearing therefor in member J, having a knob or finger-piece $j^2$ and having a lower eccentric pin or stud $j^3$ working in a transverse slot in the plate $j$.

As before stated, the film may be fed or moved in any approved manner to give a realistic reproduction of the motions of the person or object represented, though the most satisfactory and preferred way is to feed the film intermittently with brief intervals of rest or exposure exceeding the periods of movement required to effect displacement and substitution of one picture after another, so that the intervals of change, while frequent, are practically instantaneous or indiscernable, while each picture is exposed a sufficient time to produce the proper impression on the eye. The feeding mechanism herein represented is similar to that shown and described in my former United States Letters Patent No. 578,185, March 2, 1897. At the far or upper end of the plate G is mounted a feed-drum L, provided with teeth or projections for engaging perforations or apertures in the edges of the film. On the shaft or axle of this drum is secured a star-wheel or disk M, preferably at the fixed side of the casing immediately within the standard of the frame for the mechanism, and said wheel or disk is provided with radial slots, preferably four in number, extending to the periphery of the wheel and concave or depressed portions between the slots, the wheel thus having substantially the form of a Maltese cross. Adjacent to the star-wheel M is a rotary disk or element N, having on its face a pair of oppositely-disposed pins or projections $n$, adapted one after another to enter successively the slots in the star-wheel and intermittently turn the latter as the disk or element rotates. The disk N has also on its face curved surfaces or segments $n'$ intermediate the pins $n$, adapted to permit the star-wheel to turn when engaged by one of the pins, but to enter and contact with said depressed or concaved portions as soon as a pin leaves one of the slots, so as to hold the star-wheel still in the proper interval required for exposing the picture and to cause the next slot always to register with the next pin. The shaft of the disk N is shown having a small pinion O, meshing with a gear-wheel P on the main driving shaft or axle, which latter is journaled in a bearing Q, projecting from a hanger or standard through an opening therefor in the fixed side of the casing and has an operating-crank R. It will be understood, of course, that this feed mechanism may be modified in various ways, or, as before stated, other devices for producing the necessary movement of the film may be adopted.

At the opposite end of the plate G a suitable device may be provided, if desired, for paying out slack in the film to be taken up by the feed-drum; but with the arrangement described such a device is unnecessary, and hence is not shown, since sufficient slack and yet proper hold is presented in the film itself lying in the lower part of the casing and the gentle pressure of the tensioning device or strips K is sufficient to keep the film flat and smooth at the point of exposure and to offer proper resistance to the feed movement, though not enough to cause injury or tearing of the film by the teeth of the drum, while a number of perforations are always engaged by said teeth and the movements of the feed-drum are so slight and frequent, resembling continuous motion, as to avoid all liability of injury. The said opposite or lower end of the plate G is, however, preferably rounded, as at $g$, for the film to pass smoothly thereover and provided with lateral shoulders or projections, as $g'$, to guide the approaching portions of the film properly onto the plate. The tensioning-strips K are also preferably extended at both ends to overlie the said rounded part $g$ in one instance and press the edges of the film gently down between the guides $g'$ and to overlie the drum, on the other hand, and likewise gently press the edges of the film thereon and insure engagement of the teeth of the former with the perforations of the latter. The rounded parts of said strips which overlie the drum may be slotted lengthwise, as shown in Fig. 9, to accommodate the teeth.

It will be observed by reference to Fig. 1 that the operating mechanism is substantially inclosed in the bulk of the film, or, in other words, the film passes over or through said mechanism and practically surrounds the same, the greater part of its length lying in loose folds in its casing or receptacle. By this arrangement the film constantly presents its own slack to the feeding mechanism and the necessity for rollers, guides, and devices for paying out slack is dispensed with.

For the purpose of intermittently obscuring the light during the brief periods of movement of the film required to displace one picture and substitute another in its stead a rotary or movable shutter S may be mounted beside the operating mechanism and arranged to pass between the mirror or diffusing-surface and the source of light during every such movement. For simplicity and compactness of construction, as well as efficiency of operation, this shutter is preferably arranged parallel to the plane of the film as a whole or at right angles to the surface of the film and so as to pass closely over the opening or inclosure in which the mirror or diffusing-surface I is located. In the present case it is mounted on the shaft of the disk or rotary element N and has two wings or sectors, thus corresponding to the two pins or projections $n$, and one of said wings or sectors passes in front of the mirror or diffusing-surface every time one of said pins $n$ engages the star-wheel M and moves the feed-drum. To accommodate the shutter, the plate C on the inner side of the hinged or removable side member B is cut away a suitable amount, and behind or at the inner side of the shutter a small dark plate $c$ may be secured to the frame of the operating mechanism to protect the film from the shutter.

The operation of the machine is similar to that of other well-known kinetoscopes—such, for example, as illustrated in my aforesaid patent—and it will be well understood from the foregoing description, taken in connection with the accompanying drawings. As the crank R is rotated in the direction of the arrows in Figs. 1, 4, 5, and 7 the feed-drum is intermittently turned in the manner before explained and draws the film step by step over the opening in the plate G, thus exposing one picture after another in rapid progression and giving the appearance of an object in motion. During each movement of the film the shutter passes across or in front of the mirror and shuts off the light, while during the intervals of rest the light coming through the glass H is projected or diffused by the mirror or diffusing-surfaces I up through the film, thus producing the proper illumination.

In Fig. 6 I have illustrated an attachment for reflecting light to the diffusing or illuminating surface I when taken, for example, from above the machine or from other points instead of directly from the side. This attachment consists simply of a mirror T, mounted at the side of the casing below or near the glass plate H at a suitable angle for reflecting light through said plate or opening onto the surface I, which latter is here indicated in dotted lines. The mirror T may be connected by a stiff hinge to a small disk or plate $t$, clamped against the side of the casing by means of a binding-screw entered through said plate and one of the openings of the reticulated side and screwed into another disk or plate $t'$. Thus the mirror may be set at any angle or turned in any position about the screw as an axis, according to the direction of light, and it may also be readily detached or removed.

Having thus fully described my invention, what I claim as new, and desire to secure by Letters Patent of the United States, is—

1. In a vitascope, the combination of a transparent or translucent picture-carrying strip or film, a casing or receptacle inclosing the same, means for feeding or moving the film and successively exposing or exhibiting the pictures thereon, and means for illuminating the film behind its exposed portion by diffused light derived from the natural or other light surrounding the apparatus as a whole.

2. In a vitascope, the combination of a transparent or translucent picture-carrying strip or film, a casing or receptacle therefor having an internal width of substantially the width of the film, means for feeding or moving the film and successively exposing or exhibiting the pictures thereon, and means for illuminating the film behind its exposed portion by the natural or other light surrounding the apparatus as a whole.

3. In a vitascope, the combination of a transparent or translucent picture-carrying strip or film, a mirror set behind the film at an angle to reflect light coming from a lateral direction through the film, and a ground-glass plate or other light-diffusing surface adapted to light up by the surrounding light and thus form a lighted-up background to the picture.

4. In a vitascope, the combination of a transparent or translucent picture-carrying strip or film, a narrow casing substantially wholly occupied by the bulk of the film lying therein in loose folds, means for feeding or moving the film and successively exposing or exhibiting the pictures thereon, and means for illuminating the film behind its exposed portion by light admitted laterally from the natural or other surrounding light outside the casing.

5. In a vitascope, the combination of a transparent or translucent picture-carrying strip or film, a casing or receptacle therefor having an internal width of substantially the same width as the film, means for feeding or moving the film and successively exposing or exhibiting the pictures thereon, and means for illuminating the film behind its exposed portion by light admitted laterally from the natural or other light surrounding the casing.

6. In a vitascope, the combination of a transparent or translucent picture-carrying film, the casing therefor having an internal width of substantially the width of the film, a light-diffusing surface within the casing behind the film, means for passing the film over said surface and successively exposing or exhibiting its pictutes thereover, and means for admitting light from the natural or other surrounding light onto said surface for diffusion through the film.

7. In a vitascope, the combination of a narrow casing having a picture-exhibiting opening in its rim or narrow side, an internal light reflecting or diffusing surface behind said opening, a film of substantially the same width as the internal width of the casing and substantially occupying said casing, means for passing the film between said surface and opening for successively exhibiting its pictures, and means for admitting light from a lateral or external source to said surface for illuminating the film at the point of exposure.

8. In a vitascope, the combination of a transparent or translucent picture-carrying strip or film, a casing or receptacle therefor, means for feeding or moving the film and successively exhibiting its pictures, and means for forming a lightened-up background for the film.

9. In a vitascope, the combination of an endless transparent or translucent picture-carrying strip or film arranged in loops or folds, means for feeding or moving the same and succesively exhibiting the pictures thereon, and means for illuminating the film behind its exposed portion by the natural or other surrounding light outside the casing.

10. In a vitascope, the combination of an endless transparent or translucent film, means for feeding or moving the same and successively exhibiting the pictures thereon, and a light reflecting or diffusing surface located within the length of the film behind the point of exposure adapted to reflect light through the film, and means for admitting light from a lateral direction to said surface, the bulk of the film lying in loose folds around and behind said surface.

11. In a vitascope, the combination of a narrow casing or receptacle having a picture-exhibiting opening in its rim or narrow side, an internal light reflecting or diffusing surface behind or opposite said opening, an endless film occupying said casing in loose folds or loops and having a flattened portion passing between said surface and said opening, means for feeding or moving the film and successively exhibiting the pictures thereon, and means for admitting light from an outside source to said surface.

12. In a vitascope, the combination of a film-receptacle, a film supporting and feeding mechanism therein, an endless film engaged by said mechanism and having the remainder of its length supported in loose folds which substantially occupy the space of the receptacle and practically surround said mechanism, and means for illuminating the film behind its point of exposure by light derived from a lateral source.

13. In a vitascope, the combination of a picture-carrying film, a light reflecting or diffusing surface, means for passing the film over said surface and successively exhibiting its pictures thereover, means for admitting light to said surface for reflection through the film, and means for intermittently shutting off the light from said surface during the periods of displacement of one picture and substitution of another.

14. In a vitascope, the combination of a picture-carrying film, means for feeding the same and successively exhibiting the pictures thereon, means for illuminating the film behind the point of exposure by light from a lateral source, and a movable shutter at right angles to the surface of the film adapted to obstruct the light intermittently during the periods of displacement of the film from one picture to another.

15. In a vitascope, the combination of a picture-carrying film, means for intermittently feeding the same for successively exhibiting the pictures thereon, means for illuminating the film behind the point of exposure by light coming from a lateral source, and a rotary shutter revolving in a plane at right angles to the surface of the film adapted to obstruct the light intermittently during the periods of movement of the film.

16. In a vitascope, the combination of a picture-carrying film, means for moving the same so as to successively expose or exhibit the pictures thereon, a light reflecting or diffusing surface disposed behind the point of exposure at an angle to the surface of the film, means for directing light to said surface for illuminating the film, and a movable shutter adapted to pass between said surface and the source of light intermittently as the pictures are successively displaced.

17. In a vitascope, the combination of a narrow casing having a picture-exhibiting opening in its rim or peripheral part and having a removable side, plates arranged on the inner faces of the sides of the casing forming between them a narrow film-receptacle, the plate at the removable side being removable therewith, a film arranged in said receptacle, and operating mechanism for feeding the film and successively exhibiting the pictures thereon mounted beneath or within said opening and engaging a portion of the film.

18. In a vitascope, a narrow casing having a picture-exhibiting opening in its rim or peripheral part and having a removable side, a film occupying the inclosure of said casing, an angularly-disposed light reflecting or diffusing surface located beneath or within said opening over or before which the film is passed, means for admitting light thereto from a lateral source, a supporting-plate for the film above said surface having an opening to admit light therefrom through the film, a hinged spring-pressed tensioning device pressing the film against said plate and adapted to be raised to permit its insertion or removal, and means for feeding the film to exhibit successively the series of pictures thereon.

19. In a vitascope, a narrow casing having a picture-exhibiting opening in its rim or peripheral part, a film occupying the inclosure of said casing, an angularly-disposed light reflecting or diffusing surface located beneath or within said opening over or before which the film is passed, means for admitting light laterally thereto from outside the casing, means for supporting or tensioning the film in its passage over said surface, a rotary feed device for intermittently moving the film, and a rotary shutter substantially at right angles to the surface of the film timed to rotate with the feed device and to pass intermittently beside said surface to obstruct the light during the periods of movement of the film.

20. In a vitascope, the combination of a film-feeding device, a film-receptacle, a film therein, and means for causing the portion of the film which is drawn toward said device to arrange itself in a plurality of loose folds or loops in said receptacle, by reason of which the film is presented to said feeding device in folds to provide slack.

21. In a vitascope, the combination of a film-receptacle, a film-feeding device, and an endless film arranged in said receptacle and engaged by said device, said feeding device paying out the leaving portion of the film into said receptacle, which, by virtue of its periphery, causes the same to assume loose folds which take up the whole remaining length of the film so as to constantly provide slack in the portion thereof directly approaching the feeding device.

22. In a vitascope, the combination with a picture-carrying strip or film, of an intermittent feeding device therefor, and means for holding the approaching portion of the film so as to cause it to assume a plurality of loose folds or loops to provide slack immediately in front of the feeding device.

23. In a vitascope, the combination with an endless film, of a feeding device engaging the film, and means for forming and maintaining a series of folds or loops in the film for its entire length between the front and back ends of the feeding device.

24. In a vitascope, the combination of a rotary film-feeding element adapted to cause intermittent movement of the film, means for illuminating the film at the point of exposure, and a rotary shutter mounted on the shaft of said element adapted to obstruct illumination simultaneously with movement of the film.

25. In a vitascope, the combination of a film and rotary feeding element adapted to produce intermittent movement thereof, means for illuminating the film behind the point of exposure by light coming laterally, and a rotary shutter mounted on the shaft of said element adapted to pass between the source of light and said illuminating means simultaneously with movement of the film.

26. In a vitascope, the combination of a film and a feed-drum engaging the same, of a star-wheel connected with said drum, a rotary element having a plurality of projections adapted one after another to engage and turn said star-wheel to rotate the drum intermittently, means for illuminating the film behind the point of exposure by light coming laterally, and a shutter mounted on the shaft of said element having a plurality of wings or sectors corresponding to the number of projections on said element, one of which wings is adapted to obstruct the light from said illuminating means during each movement of the film.

27. In a vitascope, the combination of a film-supporting member over which the film is passed and portions thereof successively exhibited, an angularly-disposed light reflecting or diffusing surface beneath the same adapted to diffuse light coming laterally to the movement of the film, means for pressing the film gently against said member, a feed-drum at one end of said member engaging the film, means for rotating said drum intermittently, and a rotary shutter at right angles to the axis of said drum adapted to pass beside said surface simultaneously with movement of the film.

28. In a vitascope, a narrow upright casing consisting of a rim or peripheral part, and ornamental reticulated or open-work sides, and plates located within said sides having dark outer frames to give the appearance of darkness through said sides, said plates forming between them an inclosure for a picture-carrying film.

29. In a vitascope, a film-casing having a picture-exhibiting opening, and a lens mounted in a holder over said opening, said lens having upper and lower flanges, overlying lugs on the case in which its lower flange rests, a slotted overlying lug engaging the upper flange, and a binding-screw entered through the slot of the latter and screwed into casing.

30. In a vitascope, the combination of a transparent or translucent picture-carrying strip or film, an outside casing, an inside narrower casing of substantially the same width as the film, a mirror or light-reflecting means set at an angle to reflect light coming from a lateral direction through the film, and means for feeding the film into the narrow casing so as to form slack or loose folds behind and on each side of the reflecting means.

In testimony whereof I affix my signature in presence of two witnesses.

THOMAS ARMAT.

Witnesses:
T. BLAIR SHOEMAKER,
P. E. BALLINGER.